Patented Nov. 24, 1953

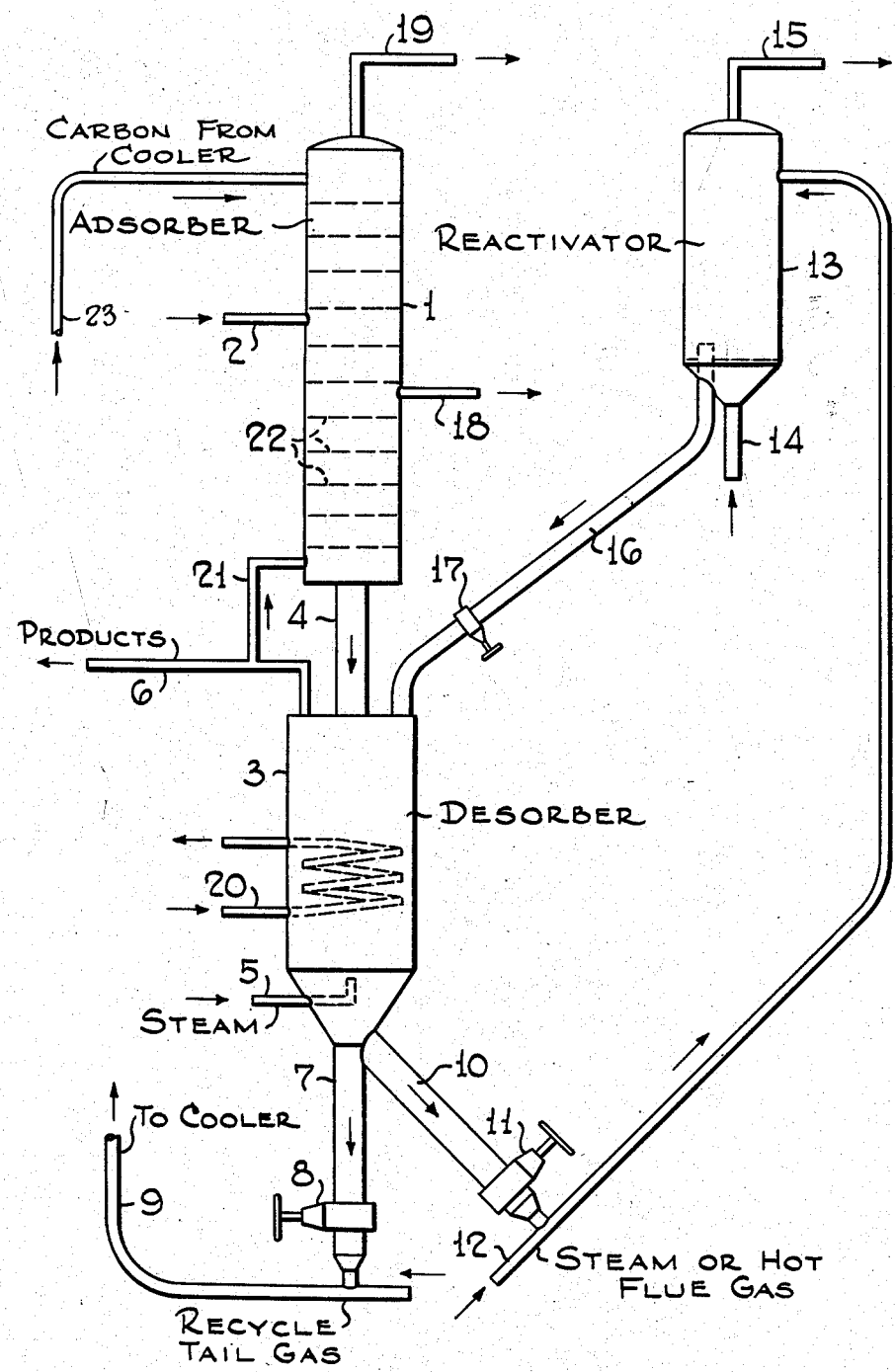

2,660,262

UNITED STATES PATENT OFFICE 2,660,262

ADSORPTION-DESORPTION PROCESS

Edward W. S. Nicholson, Baton Rouge, La., assignor to Standard Oil Development Company, a corporation of Delaware Application July 19, 1950, Serial No. 174,675

3 Claims. (Cl. 183—114.2)

This invention relates to an improved method of separating components of a mixture, particularly a mixture of hydrocarbons, by means of adsorption on solid adsorbents. Particularly, the invention relates to an improved method of effecting the desorption of the adsorbed material from the solid adsorbent. More specifically the invention is concerned with an adsorption-desorption process in which at least part of the required heat for the desorption is supplied to the desorber in the form of sensible heat of hot reactivated solid adsorbent.

The process of separating components of mixtures, both liquid and gaseous, by means of solid adsorbents has been well described. It is known that components of a mixture having varying degrees of adsorbability may be separated by contacting the mixture with a solid adsorbent whereby the more adsorbable component is adsorbed by the solid in preference to the less adsorbable component. The solid is then treated to recover the more adsorbable component therefrom in a process called desorption. The latter is usually accomplished by heat or stripping with steam or inert gas, or less usually by means of washing with a solvent for the adsorbed component.

It is well known that hydrocarbon mixtures, particularly gaseous mixtures, are separated into their components by treating them in intimate contact with solid adsorbents particularly activated carbon, silica gel, etc. In general it may be said that the activated carbons separate the hydrocarbons roughly by molecular weight, the higher molecular weight components of the hydrocarbon mixture being more strongly adsorbed by the carbon. On the other hand silica gel usually displays an affinity for the olefinic or more unsaturated hydrocarbons in preference to the less unsaturated or paraffinic type.

Recently a process has been developed whereby hydrocarbon gases are separated into their components by countercurrently treating the gases with a finely-divided granular solid such as finely-divided activated carbon. In this process the granular solid containing adsorbed gases is generally heated and stripped to recover the adsorbed fractions. This heating is accomplished usually by indirect heat exchange, the heat being supplied by condensing Dowtherm vapors, by hot combustion gases or the like. In the adsorption-desorption process it is necessary to continuously reactivate at least a part of the circulating solid adsorbent to remove therefrom highly adsorbed and physically-bound high molecular weight materials which render the solid adsorbent inactive for the separation desired. This reactivation is accomplished by passing a stream of the circulating solid to a reactivation zone where it is heated to a higher temperature than that prevailing in the desorption zone. Only a relatively small proportion of the total circulating solids is sent to the reactivation zone per cycle. Usually about 1 to 3% of the solid is thus reactivated and recycled. Periodic regeneration of the solid to this extent is usually sufficient to maintain the solid at the activity desired. However, greater or lesser amounts are reactivated depending upon the state of degradation of the char. High temperatures in the reactivation zone are attained by means of superheated steam, hot combustion gases, etc.

Due to the heat requirements in the desorption zone the latter becomes probably the most expensive section of the process in terms of equipment and operating costs. According to this invention the need for expansive indirect heat exchange surface and for auxiliary Dowtherm or similar systems is eliminated or greatly reduced by supplying at least part of the heat required for the desorption by circulating from the adsorption-desorption system through the reactivator a larger proportion of the circulating solids than is required to maintain the desired activity level as described above. The hot solid from the reactivator is supplied directly to the circulating solid in the desorption zone, mixed intimately therewith whereby the necessary heat is imparted to the solid circulating therein to effect desorption of the adsorbed materials. The solid stream of partially deactivated solid is preferably drawn off the bottom of the desorption zone, wherein adsorbed materials are stripped off usually with steam or other inert gases such as nitrogen, $CO_2$, etc., and transferred to the reactivation zone which operates at essentially the same pressure as the adsorption-desorption system. The temperature in the reactivator is maintained in the range of 800° F. to 1800° F., preferably 1000° F. to 1500° F. depending upon the nature of the adsorbent, by passing through it a stream of hot flue gas and/or superheated steam. The action of the heat and gases serves to remove from the adsorbent the bulk of contaminating materials, particularly in the case of hydrocarbon separations, high molecular weight polymers. The hot reactivated solid is then returned directly preferably to the top of the desorption zone, wherein it mixes with the circulating solid. The sensible heat of the hot reactivated solid provides the necessary heat for bringing the solid entering the desorption zone up to the desorption temperature. For example, in the case of hydrocarbon separations employing activated carbon as the adsorbent, for each 100 lbs. of carbon entering the desorber from the adsorption zone at about 200° F., 60 lbs. of char at 1000° F. would be circulated thereto from the reactivator in order to provide the heat required for desorption when operating the desorber at about 500° F. If the temperature of the carbon coming from the reactivator is higher, then the amount of circulated carbon is, of course, lower. For example, only 30 lbs. of carbon at 1500° F. would be required to supply the same heat as 60 lbs. of carbon at 1000° F.

The invention will be more readily understood by reference to the accompanying drawing, which is a semi-diagrammatic sketch of the equipment employed in the process of the invention.

Referring to the drawing, the process will be described with reference to the separation of a hydrocarbon mixture of $C_2$, $C_1$, and lighter components such as $H_2$, CO, etc., employing activated carbon as the adsorbent. Numeral 1 represents the adsorption vessel containing the granular, finely-divided carbon. The carbon may be in a fluidized condition in the form of a bed of dense turbulent material having a well defined upper level and resembling a boiling liquid, or the solid may be in the form of a slowly gravitating bed moving progressively at a predetermined rate through the zone. When operating with fluidized carbon the adsorption vessel may also contain plates 22 to permit staging and to accomplish true countercurrent action between the carbon and the gases. The hydrocarbon gas feed enters the adsorption zone through line 2, preferably at about the mid-point thereof, and passes upwardly countercurrent to the downflowing carbon. The heavier components of the hydrocarbon mixture are adsorbed preferentially by the carbon, while the lighter material, viz., the $CH_4$, $H_2$, etc., are relatively unadsorbed and pass upwardly through the adsorption zone being removed from the upper end of the zone via line 19. This unadsorbed gas is known as tail gas. The carbon, which contains adsorbed thereon chiefly $C_2$ hydrocarbons, passes downwardly via pipe 4 into desorption zone 3. Part of the product gas drawn off through line 6 may be returned to the bottom of adsorber 1 through line 21 to act as reflux for this downflowing stream. The desorption zone may be a separate vessel as illustrated or may be incorporated integrally as the bottom section of the adsorption tower proper. In the desorption zone the carbon is heated preferably in the presence of a countercurrent hot stripping gas such as steam, $N_2$, $CO_2$ or flue gas added via line 5 to a sufficiently high temperature to effect desorption of the $C_2$ hydrocarbon components which are removed via line 6 together with any steam or inert gas and processed for further purification. In the desorption zone a temperature of about 450–500° F. is usually required to achieve the desorption from the carbon of adsorbed hydrocarbon components. This heat is supplied at least in part by means of the sensible heat of the hot reactivated carbon entering the top of the desorption zone via line 16 through valve 17. Hot denuded carbon is removed from the desorption zone via line 7 controlled by valve 8, lifted by means of recycle tail gas in line 9, carried through a cooling zone (not shown) and reintroduced into the upper section of the adsorption zone via line 23 to repeat the adsorption process. A controlled portion of the hot denuded carbon is removed from the desorber via line 10 controlled by valve 11 and conveyed by means of steam or hot flue gas via line 12 into reactivator 13. In the reactivator the carbon is subjected to a sufficiently high temperature to remove therefrom any materials adsorbed thereon which contribute to the deactivation of the carbon. Usually in the case of hydrocarbon separations these deactivants comprise high molecular weight hydrocarbons, but particularly high molecular weight polymeric bodies, sulfur compounds, etc. Reactivation is satisfactorily accomplished in practically all such instances by treating the carbon with superheated steam, hot flue gas or other combustion gas entering the reactivator via line 14. In some cases, steam or other oxidizing gas is used to remove carbonaceous contaminants by the water-gas reaction.

The hot flue gases leaving the reactivation zone via line 15 are passed through a one- or two-stage gas turbine which generates power required to operate the various blowers, air and product compressors, etc., for the adsorption unit.

The temperature maintained in the reactivator is usually the lowest temperature necessary to achieve the desired activation and of course depends upon the extent of deactivation of the carbon. A satisfactory activity level is an activity of about 80% of the original activity of the carbon. It is preferred, of course, not to contact the carbon in the presence of steam for too long a period at temperatures above 1100° F. as the water-gas reaction is thereby promoted to such a degree that excessive amounts of the carbon are consumed in the reaction. Subjection of the carbon to lower temperatures for longer periods of time or to a greater volume of steam/volume of carbon may be substituted for the higher temperature treatment. The temperature of the carbon leaving the reactivation zone via line 16 lies in the range of 800°–1800° F., preferably about 1000°–1500° F. This hot carbon, the flow of which is controlled by valve 17, enters the top of the desorber and mixes directly with the downflowing carbon passing from the adsorption zone into the desorption zone usually at a temperature of 125°–200° F. thereby imparting heat thereto in direct heat exchange. The amount of carbon removed from the desorber via line 10 and returned to the desorber through line 16 after passing through the reactivator is greater than the amount of carbon usually required to undergo reactivation to maintain the carbon activity. In general removal of about 1 wt. per cent of the carbon per cycle from the desorber for reactivation purposes suffices to keep the carbon at a satisfactory activity level of about 80% of the original carbon. The excess carbon removed to supply the required heat for desorption amounts at a maximum to about 50 wt. per cent of the circulating carbon, preferably about 33⅓%. Desorber 3 is equipped with a heating coil 20 for auxiliary heat if desired. This coil may be heated with Dowtherm, steam or other hot circulating fluid. However, it is realized that the total heat for desorption can be adequately supplied by the circulating hot reactivated carbon.

The process is not limited to the separation of only two components but can be readily adapted to fractionation of mixtures containing three or more desired components. For example, if a $C_1$–$C_3$ hydrocarbon mixture is being fractionated, the adsorption tower can be operated so that the lower section thereof acts as a rectification zone. Thus, the light gases can be removed via line 19, the $C_2$ fraction via line 18, and the $C_3$ fraction from the desorber via line 6.

The adsorption-desorption system described is merely exemplary and it is not intended that the invention be limited thereto. The circulating solid adsorbent may be activated carbon, silica gel, clay, bauxite, alumina or other solid depending upon the separation desired.

In the drawing only those features have been illustrated which are necessary to demonstrate the invention. For example, solid separators, gas scrubbers, pumps, etc. all of which are necessary to maintain the necessary flow of materials and to assure product purity have not been illustrated.

The invention is generally applicable to fractionation processes of the type illustrated above, involving selective adsorption of one or more components from a mixture containing other components which are more and less readily adsorbed. In such operations it may be used to separate hydrocarbon mixtures into fractions of different boiling range or chemical structure by suitable selection of adsorbents and stripping agents in conformity with chromatographic principles. For example, paraffins, naphthenes, olefins, diolefins and aromatics may be obtained as separate fractions from mixtures of two or more of these classes of hydrocarbons with a silica gel adsorbent used in an adsorption process as described above in one or more stages according to the number of fractions to be separated. Similarly, organic vapors of different degrees of polarity may also be seperated by selective adsorption on any suitable solid adsorbents.

The process is particularly applicable to the recovery of $C_2$ and $C_3$ hydrocarbons from refinery fuel gas; to the recovery of light ends from low-pressure catalytic cracking gases; to the recovery of hydrocarbons and oxygenated compounds from hydrocarbon synthesis gas produced at low pressures; to the separation of methane from nitrogen; to the recovery of acetylene from the gases of the Wulff process, and to the separation of $C_2$, hydrogen sulfide, and light oil fractions from coke-oven gas.

The invention described has the advantages that it eliminates exchanger surface in the desorption section of the system thereby doing away with an extraneous heating medium such as Dowtherm. It also eliminates the auxiliary steam stripper for sidestream stripper carbon should a high purity sidestream be required.

In addition the invention permits an adsorbent of higher average activity to circulate in the adsorber, since a larger portion of the circulating adsorbent will undergo a high temperature stripping in the reactivator. This will reduce total adsorbent circulation as well as total heating and cooling loads. The invention also permits available power to be used in air and product compression.

What is claimed is:
1. In the separation of components of a mixture having varying degrees of adsorbability comprising contacting the mixture in an adsorption zone with a solid adsorbent whereby the more adsorbable component is adsorbed thereon, passing the adsorbent from the adsorption zone to a desorption zone and heating the solid adsorbent in the desorption zone to remove the more adsorbable component therefrom, the improvement which comprises removing 30 to 60% of the denuded adsorbent from the desorption zone to a reactivation zone, heating the adsorbent in the reactivation zone directly by contact with hot combustion gases to a temperature higher than that employed in the desorption zone to remove deactivating contaminants from the adsorbent, and returning hot reactivated adsorbent from the reactivation zone to the top of the desorpion zone to supply at least part of the necessary heat to effect desorption of said more adsorbable component.

2. A process according to claim 1 in which the adsorbent is activated carbon.

3. A process for concentrating a $C_2$ hydrocarbon fraction and a $C_3$ hydrocarbon fraction from a gaseous mixture comprising $C_1$ to $C_3$ hydrocarbons by means of adsorption by activated carbon which comprises passing activated carbon downwardly through an adsorption zone having an adsorption section above the gaseous mixture feed point, a middle rectification section and a lower desorption section below the gaseous mixture feed point, feeding the gaseous mixture to a lower portion of the adsorption zone, removing unadsorbed methane from an upper portion of the adsorption zone, removing a $C_2$ hyrocarbon fraction from the rectification section, heating the activated carbon in the desorption section to remove $C_3$ hydrocarbons therefrom, leaving a denuded carbon withdrawing 30 to 60% of the denuded carbon from the desorption zone to a reactivation zone, removing the remainder of the denuded carbon from the desorption zone and returning it to the adsorption zone, heating the denuded carbon in the reactivation zone by direct contact with combustion gases to a temperature higher than that employed in the desorption zone thereby removing deactivants therefrom, and returning the hot reactivated carbon from the reactivation zone to the top of the desorption zone to supply at least a part of the heat required to desorb the $C_3$ hydrocarbons from the carbon in said desorption zone.

EDWARD W. S. NICHOLSON.

References Cited in the file of this patent
UNITED STATES PATENTS

| Number | Name | Date |
|---|---|---|
| 2,523,149 | Scheeline | Sept. 19, 1950 |

OTHER REFERENCES

"Hypersorption Process for Separation of Light Gases," Clyde Berg; A. I. Ch. E. Transactions, August 25, 1946, pgs. 665 to 680.